United States Patent
Muhammad et al.

(10) Patent No.: US 9,795,948 B2
(45) Date of Patent: Oct. 24, 2017

(54) SUNLIGHT ACTIVE COMPOSITE PHOTOCATALYST FOR WATER PURIFICATION

(71) Applicant: KING ABDULAZIZ UNIVERSITY, Jeddah (SA)

(72) Inventors: Abdul Hameed Fateh Muhammad, Jeddah (SA); Mohammad Aslam Inayatullah, Jeddah (SA); Iqbal M. I. Ismail, Jeddah (SA); Sivaraman Chandrasekaran, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 376 days.

(21) Appl. No.: 14/599,358

(22) Filed: Jan. 16, 2015

(65) Prior Publication Data

US 2016/0207030 A1    Jul. 21, 2016

(51) Int. Cl.

| | |
|---|---|
| *B01J 23/75* | (2006.01) |
| *B01J 35/00* | (2006.01) |
| *B01J 23/06* | (2006.01) |
| *C02F 1/30* | (2006.01) |
| *C02F 1/72* | (2006.01) |
| *B01J 37/03* | (2006.01) |
| *B01J 37/04* | (2006.01) |
| *B01J 37/08* | (2006.01) |
| *B01J 35/02* | (2006.01) |

(Continued)

(52) U.S. Cl.
CPC ............ *B01J 23/75* (2013.01); *B01J 23/06* (2013.01); *B01J 35/004* (2013.01); *B01J 35/026* (2013.01); *B01J 37/0072* (2013.01); *B01J 37/036* (2013.01); *B01J 37/04* (2013.01); *B01J 37/08* (2013.01); *C02F 1/30* (2013.01); *C02F 1/725* (2013.01); *C02F 2101/30* (2013.01); *C02F 2101/308* (2013.01); *C02F 2305/023* (2013.01); *C02F 2305/10* (2013.01); *Y02W 10/37* (2015.05)

(58) Field of Classification Search
None
See application file for complete search history.

(56) References Cited

U.S. PATENT DOCUMENTS

| | | | |
|---|---|---|---|
| 7,754,648 | B2 | 7/2010 | Tsujmichi et al. |
| 8,404,204 | B2 | 3/2013 | Sergi et al. |
| 8,524,325 | B2 | 9/2013 | Takahashi et al. |

(Continued)

FOREIGN PATENT DOCUMENTS

EP         1 512 728 A1      9/1925

OTHER PUBLICATIONS

Novel cobalt zinc oxide catalysts.pdf—"Novel cobalt zinc oxide Fischer-Tropsch catalysts sythesised using supercritical anti-solvent precipitation" Catal. Sci. Technol.—Marin, Raimon P. et al—published Apr. 8, 2014.*

*Primary Examiner* — Krishnan S Menon
*Assistant Examiner* — Bradley R Spies
(74) *Attorney, Agent, or Firm* — Richard C. Litman (57) ABSTRACT

The sunlight active composite photocatalyst for water purification includes ZnO (zinc oxide) and $Co_3O_4$ (cobalt II, III oxide). The composite photocatalyst may, in the presence of natural sunlight, achieve complete mineralization of chemical and biological contaminants in water without leaving any hazardous by-products. The composite photocatalyst may be synthesized by a sol gel route or process.

6 Claims, 5 Drawing Sheets

(51) Int. Cl.
 *B01J 37/00* (2006.01)
 *C02F 101/30* (2006.01)

(56) References Cited

U.S. PATENT DOCUMENTS

| | | |
|---|---|---|
| 2002/0108846 A1 | 8/2002 | Davydov et al. |
| 2010/0167914 A1 | 7/2010 | Anderson et al. |
| 2012/0267321 A1 | 10/2012 | Kisailus et al. |
| 2013/0168228 A1* | 7/2013 | Ozin .................... B01J 35/004 204/157.9 |

* cited by examiner

SUNLIGHT ACTIVE COMPOSITE PHOTOCATALYST FOR WATER PURIFICATION

BACKGROUND OF THE INVENTION

1. Field of the Invention

The present invention relates to water purification, and particularly to a sunlight active composite photocatalyst for water purification that provides a composite photocatalyst for single-step removal of chemical and biological contaminants from water.

2. Description of the Related Art

New and improved methods of providing clean water must be identified in order to meet the demands of a growing world population. Efficient methods for water decontamination need to be explored, as existing multi-step water treatment technologies have been inefficient and uneconomical. The majority of water pollutants are hazardous chemical compounds and pathogenic microorganisms. The key chemical contaminants found in water generally include a variety of organic compounds, such as complex colored substances and stable phenol derivatives. These compounds are either released from the effluents of the chemical/petrochemical industry or generated in situ during chlorination and ozonization treatments for removal of biological contaminants. This class of secondary pollutants, due to their chemical stability and complex molecular structure, is difficult to remove by conventional techniques and typically requires in situ generation of highly energetic oxidation species for complete mineralization. In addition, their degradation by conventional procedures leads to the formation of another stream of secondary pollutants, which further aggravates the situation.

In the field of photo catalysis, titanium dioxide ($TiO_2$) has generally been the most widely studied photocatalyst. The efficiency of a photocatalytic process may be measured in terms of its ability to absorb and harvest the absorbed photons. While $TiO_2$ has been used for air and water decontamination, $TiO_2$ absorbs only 3% of the solar energy due to a wide bandgap of 3.2 eV, which imposes a serious restriction on its use in sunlight. In fact, many conventional photocatalytic processes suffer from shortcomings related to low photon absorption capability due to wide bandgaps and high recombination rate of charge carriers. Almost all of the active photocatalysts (such as $TiO_2$, ZnO, $WO_3$ and NiO) suffer low activity in the sunlight, either due to wide bandgap, i.e., ≥3.0 eV, or due to a high recombination rate, leading to high luminescence rather than photocatalytic activity. The reactions that may be associated with photocatalysis are provided below.

$$SC + h\theta \rightarrow SC(e_{CB}^-, h_{VB}^+) \rightarrow \text{Recombination}$$

$$h_{VB}^+ + H_2O \rightarrow HO^* + H^+$$

$$e_{CB}^- + \text{Dissolved } O_2 \rightarrow O_2^{-*}$$

$$e_{CB}^- + H^+ \rightarrow H^*$$

$$H^* + H^* \rightarrow H_2$$

$$HO^* + HO^* \rightarrow H_2O + \tfrac{1}{2}O_2$$

$$HO^* + H^* \rightarrow H_2O \rightarrow \text{Recombination}$$

The photogenerated oxidizing species, i.e., hydroxyl radicals ($OH^*$) and superoxide radicals ($O_2^{-*}$), may interact with contaminants, either biological or chemical, for mineralization, as depicted below, $$HO^* + \text{Contaminants} \rightarrow \text{Oxidation} \rightarrow \text{Mineralization} (CO_2 + H_2O)$$

$$O_2^{-*} + \text{Contaminants} \rightarrow \text{Oxidation} \rightarrow \text{Mineralization} (CO_2 + H_2O)$$

Among the existing photo catalysts, zinc oxide (ZnO) is an important competitor of $TiO_2$ for environmental applications. ZnO has a sufficiently negative conduction band edge for superoxide radical formation from adsorbed oxygen, and a suitable valence band edge for hydroxyl radical formation from water oxidation. However, ZnO, by itself, suffers anodic photo corrosion under illumination and lacks sufficient stability in highly acidic and basic medium.

Thus, a sunlight active composite photocatalyst for water purification solving the aforementioned problems is desired.

SUMMARY OF THE INVENTION

The sunlight active composite photocatalyst for water purification includes two physically and chemically compatible components, such as ZnO (zinc oxide) and $Co_3O_4$ (cobalt II, III oxide). The composite photocatalyst, in the presence of natural sunlight, achieves complete mineralization of chemical and biological contaminants in water without leaving any hazardous by-products. The two components of the composite photocatalyst may together achieve increased protection against photo-corrosion and stability in highly acidic and basic environments.

These and other features of the present invention will become readily apparent upon further review of the following specification and drawings.

DETAILED DESCRIPTION OF THE PREFERRED EMBODIMENTS

The sunlight active composite photocatalyst for water purification includes two physically and chemically compatible components, Component I and Component II. Component I and Component II may be water insoluble. The sunlight active composite photo catalyst for water purification has the ability to harvest sunlight with sustained high efficiency. In particular, the sunlight active composite photocatalyst for water purification may, in the presence of natural sunlight, achieve complete mineralization of chemical and biological contaminants in water without leaving any hazardous by-products. As such, the sunlight active composite photocatalyst for water purification may provide a cheap and efficient solution to water pollution. The sunlight active composite photocatalyst for water purification may be synthesized by a sol gel route or process, by which Component II is distributed on the surface of Component I.

The sunlight active composite photocatalyst for water purification may be synthesized by a hydrated sol gel technique that includes two steps. Component I of the sunlight active composite photocatalyst for water purification, the bulk photocatalyst, may be synthesized by forming the hydrated gel of a metal salt using a suitable base. For example, the metal salt for forming Component I may be acetates, nitrates, chlorides, or sulfates of W, Ni, Fe, Ti, V, Ce, Bi, or Zn. The base may include, for example, NaOH, LiOH, KOH, $NH_4OH$ and urea. The hydrated gel may be dried and calcined to obtain "Component I", which may include, for example, $WO_3$, NiO, $Fe_2O_3$, $TiO_2$, $V_2O_5$, $Ce_2O_3$, $Bi_2O_3$, or ZnO. Component I may be loaded with Component II. Component II of the sunlight active composite photocatalyst for water purification may be synthesized by forming the hydrated gel of a metal salt using a suitable base in the presence of Component I. The metal salt for forming Component II may include, for example, acetates, nitrates, chlorides, or sulfates of Fe, Co, Cu, Zn, Ag, Cr, Bi, Cd, V, or Mn. The base may include, for example, NaOH, LiOH, KOH, $NH_4OH$ and/or urea. Component II may be, for example, $Co_3O_4$ (cobalt II, III oxide).

The sunlight active composite photocatalyst for water purification may be, for example, a $ZnO/Co_3O_4$ composite photocatalyst, wherein Component I is ZnO (zinc oxide) and Component II is $Co_3O_4$ (cobalt II, III oxide).

The term "composite," as used herein, refers to the chemically viable combination of two or more semiconductors attached to each other either by physical or chemical linkage thereof.

The term "photocatalyst," as used herein, refers to a semiconductor powder capable of generating a chemical reaction upon absorption of photons of suitable energy matching the bandgap thereof, e.g., energy that is at least as high as the bandgap energy of the photocatalyst.

The term "chemical contaminants," as used herein, refers to organic molecules which are hazardous to human life when present in water. Chemical contaminants include aliphatic and aromatic water-soluble compounds, e.g., phenols and dyes thereof.

The term "biological contaminants," as used herein, refers to bacteria which are hazardous to human life when present in water.

The sunlight active composite photocatalyst for water purification may achieve high photocatalytic activity for the degradation of both biological and chemical contaminants in an aqueous medium when exposed to sunlight. For example, the photocatalytic activity of the sunlight active composite photocatalyst for water purification may be useful for the degradation of dyes (complex colored compounds) and a variety of phenol derivatives in a natural aqueous environment. The sunlight active composite photocatalyst for water purification may completely mineralize all such pollutants in a short span of time without leaving any secondary organic by-products, except for possible expected inorganic anions, such as $SO_4^{2-}$, $NO_2^-$ $NO_3^-$, $CO_3^{2-}$, $HCO_3^-$, $Cl^-$ and $Br^-$. The sunlight active composite photocatalyst for water purification may be stable under sunlight illumination.

Use of the sunlight active composite photocatalyst for water purification may provide a viable and inexpensive method for purifying water. With the sunlight active composite photocatalyst for water purification, both biological and chemical contaminants may be removed from water in a single step. In an aqueous photocatalytic process using the sunlight active composite photocatalyst for water purification, a highly oxidizing species, such as hydroxyl and superoxide radicals, may be produced as a result of water oxidation. The highly oxidizing species may be produced at the surface of the sunlight active composite photocatalyst for water purification when the sunlight active composite photocatalyst for water purification absorbs photons of appropriate energy. The oxidizing species may interact with the biological and/or chemical contaminants to achieve mineralization.

In further detail, the sunlight active composite photocatalyst for water purification may degrade contaminants present in an aqueous suspension upon absorption of light having energy at least equal to the composite photocatalyst bandgap. The present sunlight active composite photocatalyst may be active in sunlight exposure of 1000-120000 lux. The absorbed photons may induce excitation of valence band (VB) electrons to the conduction band (CB), thus generating oxidation and reduction sites, in terms of photogenerated electron-hole pair, at the surface of the sunlight active composite photocatalyst. Depending on the band edge positions, the photogenerated holes ($h_{VB}^+$) may split adsorbed water molecules to generate oxidizing hydroxyl radicals, while the photogenerated electrons ($e^-$) serve as reduction sites for the adsorbed oxygen to produce highly oxidizing superoxide radicals. These oxidizing species, produced as a cascade, mineralize the chemical contaminants present in the solution.

As described above, the present sunlight active composite photocatalyst may be a $ZnO/Co_3O_4$ composite photocatalyst. The $ZnO/Co_3O_4$ composite photocatalyst may be prepared by modifying ZnO with $Co_3O_4$. ZnO may be modified by depositing $Co_3O_4$ at its surface to form the composite photocatalyst. The two components of the composite photocatalyst may not only induce charge separation through interfacial electron transfer, but also reinforce the stability of one another, collectively achieving increased protection against photo corrosion. The composite photocatalyst provides high spectral response and high photocatalytic activity, is low in cost, non-toxic, and stable under illumination.

In more detail, the $ZnO/Co_3O_4$ photocatalyst may be prepared by a hydrated sol-gel procedure. For example, the $ZnO/Co_3O_4$ photocatalyst may be prepared by synthesizing ZnO, forming a ZnO—Co$(OH)_2$ co-gel, and heating the co-gel to form a slurry. The slurry may then be heated at temperatures of about 35° C. to 400° C. to form a dried powder. The dried powder may be calcined at temperatures of about 300° C. to 900° C. The weight percentage of Component II with respect to the metal may be, for example, 0.001% to 60%.

The $ZnO/Co_3O_4$ composite photocatalyst may successfully absorb and harvest absorbed photons. The $ZnO/Co_3O_4$ composite photocatalyst may be active in a temperature range of 25° C. to about 50° C. The $ZnO/Co_3O_4$ composite photocatalyst may remain active after successive use. The components of the composite photocatalyst accommodate interfacial electron transfer and synergistically improve absorption of photons as well as provide efficient trapping of electron-hole pair with higher productivity.

Figure 1A:
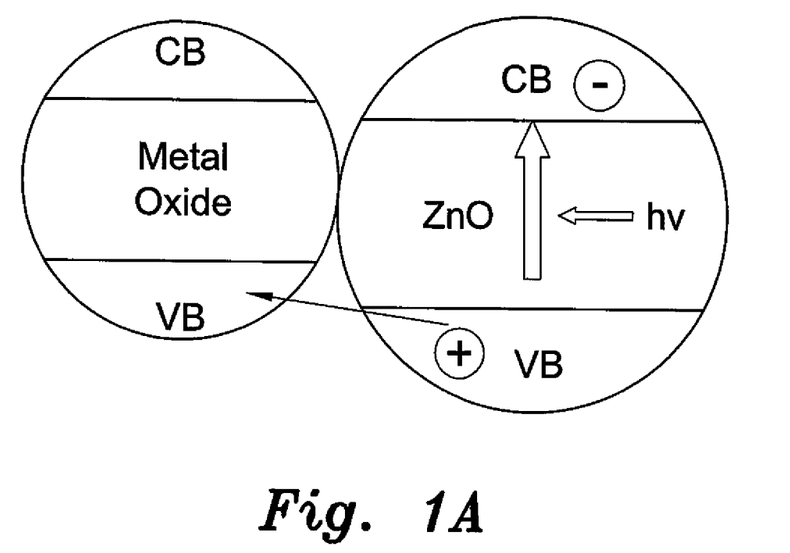
FIG. 1A is a schematic diagram showing the interfacial electron transfer that takes place between the two components of the sunlight active composite photocatalyst for water purification according to the present invention when light is incident upon the zinc oxide component.
Figure 1B:
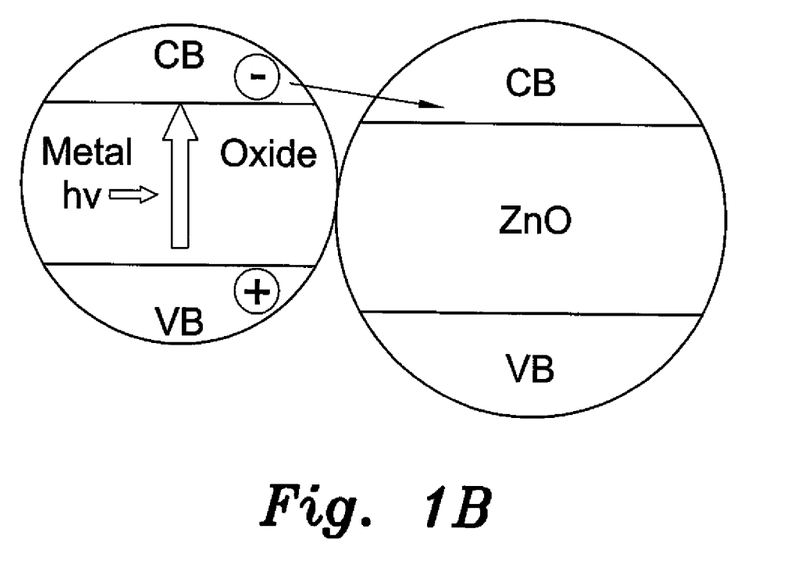
FIG. 1B is a schematic diagram showing the interfacial electron transfer that takes place between the two components of the sunlight active composite photocatalyst for water purification according to the present invention when light is incident upon the metal oxide component.

FIGS. 1A and 1B show interfacial electron transfer between the base material (ZnO (Component I)) and the modifier (metal oxide (Component II)) of a ZnO-based composite photocatalyst according to the present teachings. The interfacial electron transfer induces charge separation. The interfacial electron transfer between ZnO (Component I) and the metal oxide (Component II) also enhances the lifetime of the excited states and provides significant protection against photocorrosion. ZnO and the metal oxide together provide synergic improvement in spectral response. The metal oxide further enhances the tolerance of ZnO in an acidic or basic environment.

Several experiments were performed with a variety of water-soluble organic compounds to demonstrate the degradation ability of the sunlight active composite photocatalyst for water purification. The photocatalytic degradation experiments were performed in a Pyrex glass reactor. An optimal amount of the sunlight active composite photocatalyst for water purification ($ZnO/Co_3O_4$ composite photocatalyst), e.g., ranging from 1-5000 mg, was dispersed in 10-1000 mL of aqueous solution containing 1-100 ppm of chemical contaminant. The reactor was exposed to sunlight, and samples were drawn at regular intervals to monitor the progress of the photocatalytic process. The experiments were performed in a natural environment without controlling any parameter, such as temperature and pressure. The samples were analyzed by UV-Visible spectrophotometer, High Performance Liquid Chromatography (HPLC), Total Organic Carbon (TOC) analysis, Ion Chromatography (IC), and GC-MS. No secondary by-product was observed in any experiment.

Figure 2:
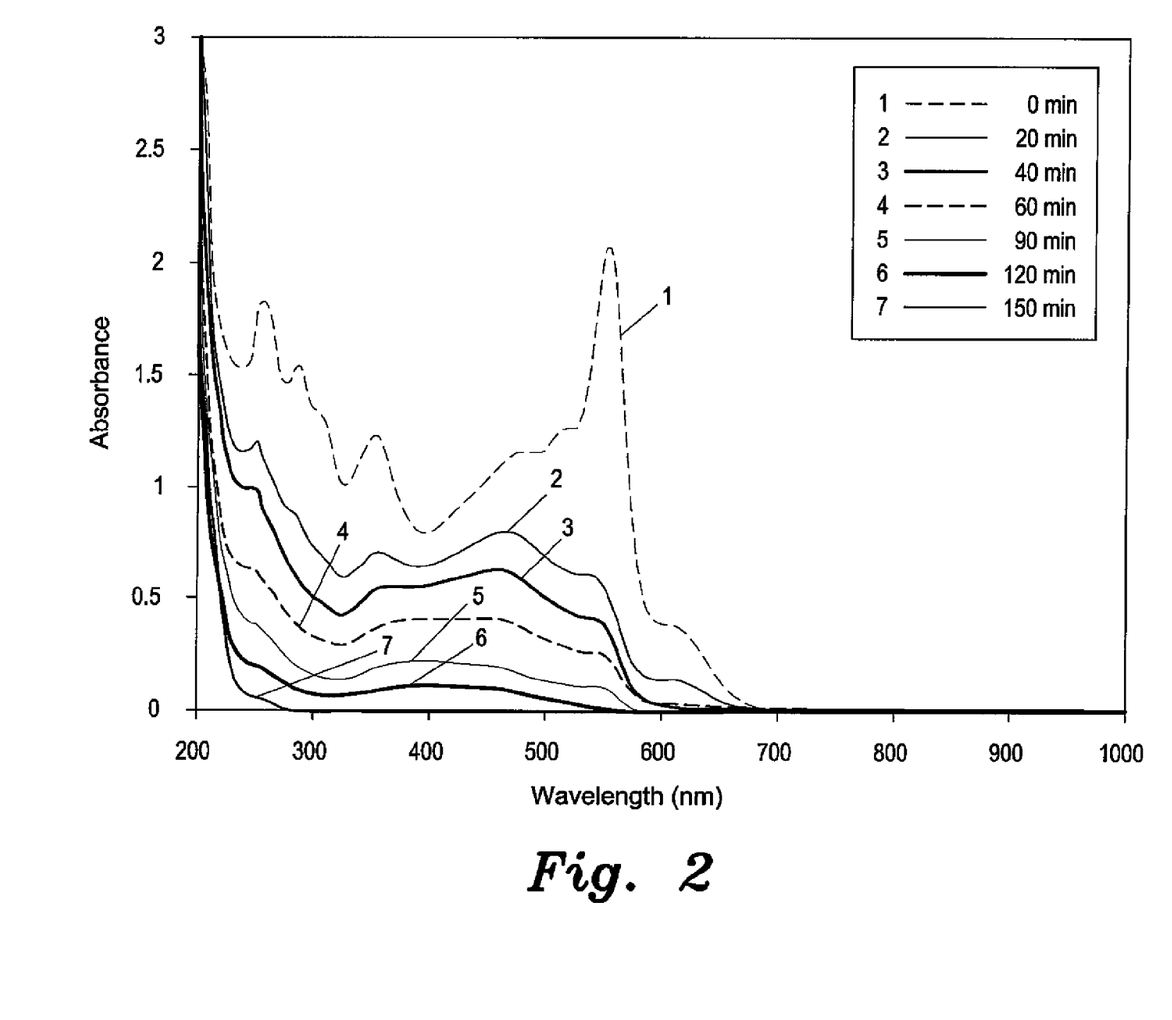
FIG. 2 is a graph showing the photocatalytic degradation profile of a mixture of dyes, including 20 ppm of methyl orange, Rhodamine B, Alizarine yellow, Indigo carmine, and Congo red, when exposed to sunlight in the presence of the sunlight active composite photocatalyst for water purification according to the present invention.

The present inventors have found that a wide variety of water-soluble organic compounds, both aliphatic and aromatic, may be mineralized in natural sunlight using the sunlight active composite photocatalyst for water purification. Such compounds include, but are not limited to, azo dyes, diazo dyes, cationic dyes, anionic dyes phenolic dyes, nitrophenols, chlorophenols, bromophenols, aminophenols, hydroxyl-phenols, alkyl-phenols, alkoxy-phenols, benzoic acid, and succinic acid. FIG. 2 shows the photocatalytic degradation profile of a mixture of dyes, including 20 ppm of each of Methyl orange, Rhodamine B, Alizarin yellow, Indigo carmine, and Congo red R, when exposed to natural sunlight in the presence of the composite photocatalyst ($ZnO/Co_3O_4$ composite photocatalyst).

The present inventors have also found that the sunlight active composite photocatalyst for water purification may completely mineralize various phenol derivatives when exposed to sunlight, without leaving any toxic or hazardous by-product. The sunlight active composite photocatalyst for water purification may mineralize, for example, 1 to 100 ppm of a variety of phenols in natural sunlight. The sunlight active composite photocatalyst for water purification may mineralize nitrophenols and dinitrophenols (e.g., 2-nitrophenol, 3-nitrophenol, 4-nitrophenol, 2,4-dinitrophenol, 2,5-dinitrophenol, and 2,6-dinitrophenol); chlorophenols and dichlorophenols (e.g., 2-chlorophenol, 4-chlorophenol, 2,3-dichlorophenol, and 2,4-dichlorophenol); bromophenols (e.g., 2-bromophenol and 4-bromophenol); aminophenols (e.g., 2-aminophenol and 4-aminophenol); hydroxyphenols (e.g., 2-hydroxyphenol (Pyrocatecol), 3-hydroxyphenol (Resorcinol), and 4-hydroxyphenol (Hydroquinone)); alkoxyphenols (e.g., 2-methoxyphenol, 2-ethoxyphenol, and dimethoxy-phenol); and dialkylphenols (e.g., 2,5-dimethyl phenol and 2,6-dimethyl phenol).

Figure 3:
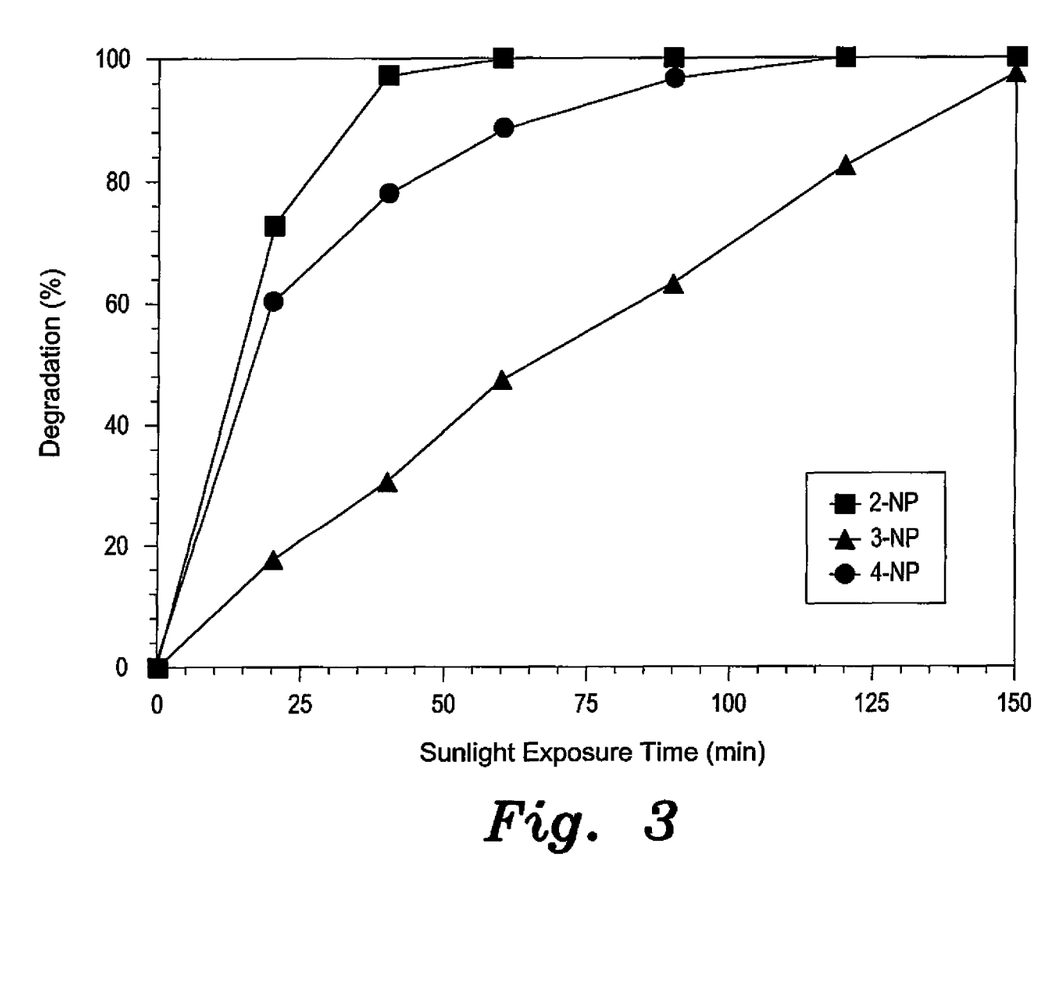
FIG. 3 is a graph showing the percentage of degradation of 2-nitrophenol, 3-nitrophenol, and 4-nitrophenol that was achieved by the $ZnO/Co_3O_4$ composite photocatalyst as a function of sunlight exposure time.
Figure 4:
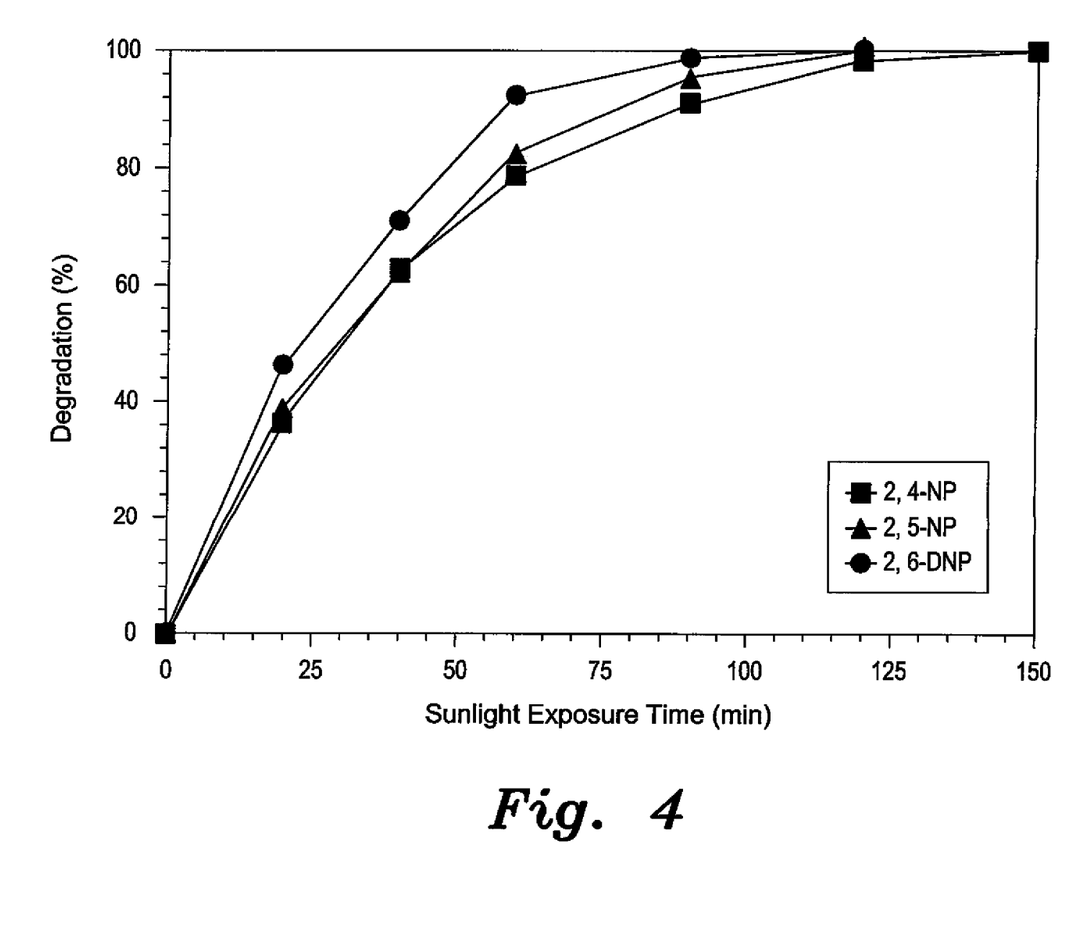
FIG. 4 is a graph showing the amount of degradation of 2,4-dinitrophenol, 2,5-dinitrophenol, and 2,6-dinitrophenol that was achieved by the $ZnO/Co_3O_4$ composite photocatalyst (at a concentration of 1000 mg-$L^{-1}$) as a function of sunlight exposure time in a natural environment.

FIG. 3 shows the percentage of degradation of 2-nitrophenol, 3-nitrophenol, and 4-nitrophenol that was achieved by the $ZnO/Co_3O_4$ composite photocatalyst as a function of sunlight exposure time. FIG. 4 depicts the amount of degradation of 2,4-dinitrophenol, 2,5-dinitrophenol, and 2,6-dinitrophenol that was achieved by the $ZnO/Co_3O_4$ composite photocatalyst (at a concentration of 1000 mg·$L^{-1}$) as a function of sunlight exposure time in a natural environment.

Figure 5:
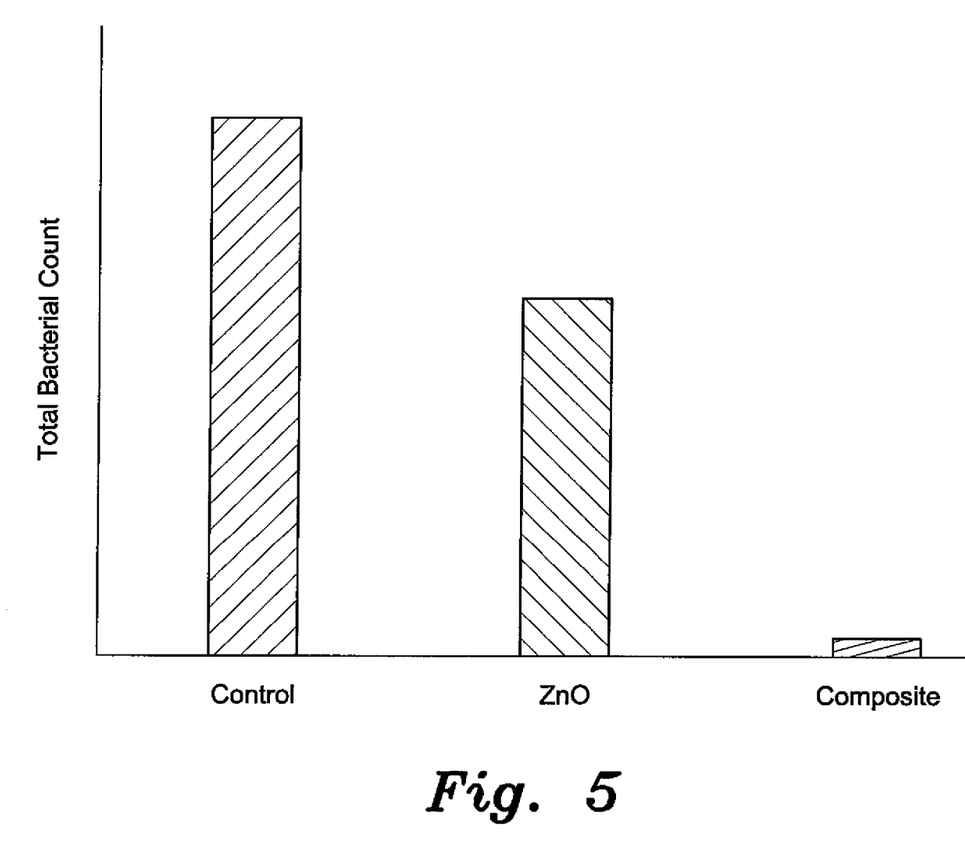
FIG. 5 is a graph showing a comparison of the extent of bacterial deactivation in sewage water, measured in terms of total bacterial count, achieved by the $ZnO/Co_3O_4$ composite photocatalyst, ZnO, and a control, after exposure to 20 minutes of sunlight.

Biological contaminants in sewage water may also be deactivated by the sunlight active composite photocatalyst for water purification when exposed to sunlight. The present inventors have found that the sunlight active composite photocatalyst for water purification is capable of deactivating bacteria in turbid sewage water. Also, the sunlight active composite photocatalyst for water purification is significantly more effective in deactivating bacteria in sewage water than a ZnO photocatalyst. FIG. 5 depicts a comparison of the extent of bacterial deactivation in sewage water, measured in terms of total bacterial count, achieved by the $ZnO/Co_3O_4$ composite photocatalyst, ZnO, and a control after exposure to 20 minutes of sunlight. The control was exposed to sunlight for 20 minutes without any catalyst. The concentration of ZnO and $ZnO/Co_3O_4$ composite photocatalyst was kept at 1000 mg·$L^{-1}$. As can be seen, the $ZnO/Co_3O_4$ composite photocatalyst achieved the greatest extent of bacterial deactivation.

Example 1

Synthesis of ZnO

Zinc Oxide (ZnO) was synthesized for use as a base material. ZnO was synthesized by dissolving an appropriate amount of zinc acetate in deionized water. The prepared solution was hydrolyzed with an equimolar amount of KOH by drop-wise addition at high stirring rate to form a hydrated gel. The gel was heated to elevated temperatures of 250° C. for 2 hrs. After aging overnight under stirring conditions, the gel was filtered and washed with deionized water for complete removal of $K^+$ ions. The gel was dried in a hot air oven overnight at 100° C., ground to a fine powder and calcined in a muffle furnace at 400-700° C. for six hours.

Example 2

Synthesis of $Co_3O_4$/ZnO Composite Photocatalyst

The composite photocatalyst was synthesized by dissolving an appropriate amount of $Co^{2+}$ (w/w) with respect to the amount of ZnO obtained in "Example 1" in deionized water. Cobalt nitrate, $Co(NO_3)_2$·x $H_2O$, was used as precursor. The $Co^{2+}$ solution was mixed with an appropriate amount of calcined ZnO to form a suspension. The ZnO-$Co^{2+}$ suspension was stirred overnight for maximum adsorption of metal ions, and then hydrolyzed with 0.5M solution of KOH until pH 9. The ZnO—$Co(OH)_2$ co-gel was heated at 250° C. for complete hydrolysis and aged overnight under stirring conditions. The resultant slurry was filtered and washed with distilled water until neutral pH was achieved, and then dried in a hot air oven at 100° C. The dried powder was calcined in a muffle furnace at 400-700° C. to obtain $Co_3O_4/ZnO$ composite photocatalyst. The synthesized catalyst was characterized by UV-Visible diffuse reflectance spectroscopy (DRS), FT-IR spectroscopy, Photoluminescence spectroscopy (PLS), X-ray photoelectron spectroscopy (XPS), X-ray diffraction analysis (XRD) and field emission scanning electron microscopy (FESEM). The composite photocatalyst was ground and passed through a 100 μm sieve for use in photocatalytic studies.

Example 3

Photocatalytic Degradation of Chemical Contaminants

The photocatalytic activity of the synthesized $Co_3O_4/ZnO$ composite synthesized in Example 2 was evaluated for the degradation of a variety of structurally different dyes and phenol derivatives. In a typical experiment, about 100 mg of the $Co_3O_4/ZnO$ photocatalyst was suspended in 100 mL solution containing 50 ppm of dye, or in 100 mL solution containing 50 ppm of phenol derivatives. The suspension of dyes included a mixture of Methyl orange, Rhodamine B, Alizarine yellow, Indigo carmine, and Congo red (20 ppm of each). One of the suspensions including phenol derivatives included 2-nitrophenol, 3-nitrophenol, and 4-nitrophenol. Another one of the suspensions including phenol derivatives included 2,4-DNP, 2,5-DNP, and 2,6-DNP. Each suspension was kept in the dark for two hours to evaluate the possible interaction of dye/phenol with the $Co_3O_4/ZnO$ composite photocatalyst, as well as adsorption. Each suspension was exposed to natural sunlight in a Pyrex glass reactor. The experiments were performed in a natural environment without stirring and temperature control. The intensity of the sunlight was measured by a LUX meter. Samples were drawn at regular intervals and analyzed by UV-Visible spectroscopy, High Performance Liquid Chromatography (HPLC), Ion Chromatography (IC), Total Organic Carbon (TOC) and GC-MS measurements. The efficiency of the photocatalytic mineralization process was also estimated at various angles of incident sunlight. The results of the various experiments are summarized in FIGS. 2-4.

Example 4

Photocatalytic Degradation of Biological Contaminants

The photocatalytic antimicrobial activity of the synthesized $Co_3O_4/ZnO$ composite photocatalyst synthesized in Example 2 was evaluated for the degradation of biological contaminants. In a typical experiment, two separate suspensions were prepared. In a first suspension, 100 mg of the composite photocatalyst was suspended in 100 mL of filtered sewage water. In a second suspension, 100 mg of composite photocatalyst was suspended in 100 ml of sewage water containing a sufficient quantity of sludge. Both of the suspensions were exposed to sunlight in a Pyrex glass reactor. The experiments were performed in a natural environment without stirring and temperature control. The intensity of the sunlight was measured by LUX meter. The collected sewage water samples at different time intervals were analyzed for total bacterial count using the spread plate technique. One milliliter of the sample was serially diluted and spread onto the surface of nutrient agar plates. The plates were incubated overnight at a constant temperature incubator maintained at 37° C., and bacterial colonies formed were counted. The $Co_3O_4/ZnO$ composite photocatalyst successfully deactivated bacteria in both samples.

It is to be understood that the present invention is not limited to the embodiments described above, but encompasses any and all embodiments within the scope of the following claims.

We claim:

1. A sunlight active composite photocatalyst for water purification and activation by absorption of sunlight, consisting of:
   ZnO (zinc oxide); and
   $Co_3O_4$ (cobalt II, III oxide) dispersed on the surface of the ZnO.

2. A method for producing a sunlight active composite photocatalyst for water purification, comprising the steps of:
   synthesizing ZnO;
   forming a ZnO—Co $(OH)_2$ co-gel by mixing the ZnO with $Co^{2+}$ solution;
   heating the ZnO—Co $(OH)_2$ co-gel to form a slurry;
   drying the slurry to form a powder; and
   calcining the powder.

3. The method for producing a sunlight active composite photocatalyst according to claim 2, further comprising the steps of:
   dissolving zinc acetate in deionized water to form a solution;
   hydrolyzing the solution with KOH to form a hydrated ZNO gel;
   heating the gel at 250° C. for 2 hrs;
   drying the gel to form ZnO powder; and
   calcining the ZnO powder.

4. The method for producing a sunlight active composite photocatalyst according to claim 2, further comprising step of heating the ZnO—Co $(OH)_2$ co-gel to a temperature of about 250° C.

5. The method for producing a sunlight active composite photocatalyst according to claim 2, wherein the slurry is dried in a hot air oven at a temperature of about 100° C.

6. A method for purifying water, comprising the step of submerging a photocatalyst in water, the photocatalyst being a composite consisting of:
   ZnO (zinc oxide); and
   $Co_3O_4$ (cobalt II, III oxide) dispersed on the surface of the ZnO.

* * * * *